US012670791B2

(12) United States Patent
Zhang

(10) Patent No.: US 12,670,791 B2
(45) Date of Patent: Jun. 30, 2026

(54) VEHICLE CONTROL METHOD, VEHICLE, AND SERVER

(71) Applicant: Yinwang Intelligent Technologies Co., Ltd., Shenzhen (CN)

(72) Inventor: Jing Zhang, Shenzhen (CN)

(73) Assignee: YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 147 days.

(21) Appl. No.: 18/644,260

(22) Filed: Apr. 24, 2024

(65) Prior Publication Data

US 2024/0274007 A1 Aug. 15, 2024

Related U.S. Application Data

(63) Continuation of application No. PCT/CN2022/127467, filed on Oct. 25, 2022.

(30) Foreign Application Priority Data

Oct. 25, 2021 (CN) .......................... 202111240905.2

(51) Int. Cl.
| | |
|---|---|
| *G08G 1/0967* | (2006.01) |
| *H04W 4/021* | (2018.01) |
| *H04W 4/44* | (2018.01) |

(52) U.S. Cl.
CPC . *G08G 1/096725* (2013.01); *G08G 1/096783* (2013.01); *H04W 4/021* (2013.01); *H04W 4/44* (2018.02)

(58) Field of Classification Search
CPC ....... G08G 1/096725; G08G 1/096783; G08G 1/141; G08G 1/22; G08G 1/0967; G08G 1/096741; G08G 1/096775; G08G 1/161; G08G 1/164; G08G 1/166; G08G 1/167; H04W 4/021; H04W 4/44; H04W 4/46
See application file for complete search history.

(56) References Cited

U.S. PATENT DOCUMENTS

| | | | |
|---|---|---|---|
| 2020/0042013 A1* | 2/2020 | Kelkar | .................. G05D 1/0088 |
| 2021/0005084 A1 | 1/2021 | Isgar | |

FOREIGN PATENT DOCUMENTS

| | | |
|---|---|---|
| CN | 110300374 A | 10/2019 |
| CN | 110304073 A | 10/2019 |
| CN | 110491179 A | 11/2019 |
| CN | 110853342 A | 2/2020 |

* cited by examiner

*Primary Examiner* — Alan D Hutchinson
(74) *Attorney, Agent, or Firm* — Conley Rose P.C.

(57) ABSTRACT

In a vehicle control method, a vehicle obtains information about an electronic fence, where the information about the electronic fence is determined based on one or more of vehicle information of the vehicle, information about a first task, lane information, and vehicle information of another vehicle, and the vehicle executes the first task based on the information about the electronic fence. The vehicle obtains the information about the electronic fence that is based on the one or more of the vehicle information of the vehicle, the information about the first task, the lane information, and the vehicle information of the another vehicle, and adjusts a vehicle status based on the information about the electronic fence.

20 Claims, 11 Drawing Sheets

500

S501: Obtain a first task of a vehicle and information about the vehicle corresponding to the first task S502: Determine information about an electronic fence corresponding to the first task S503: Send the information about the electronic fence to the vehicle

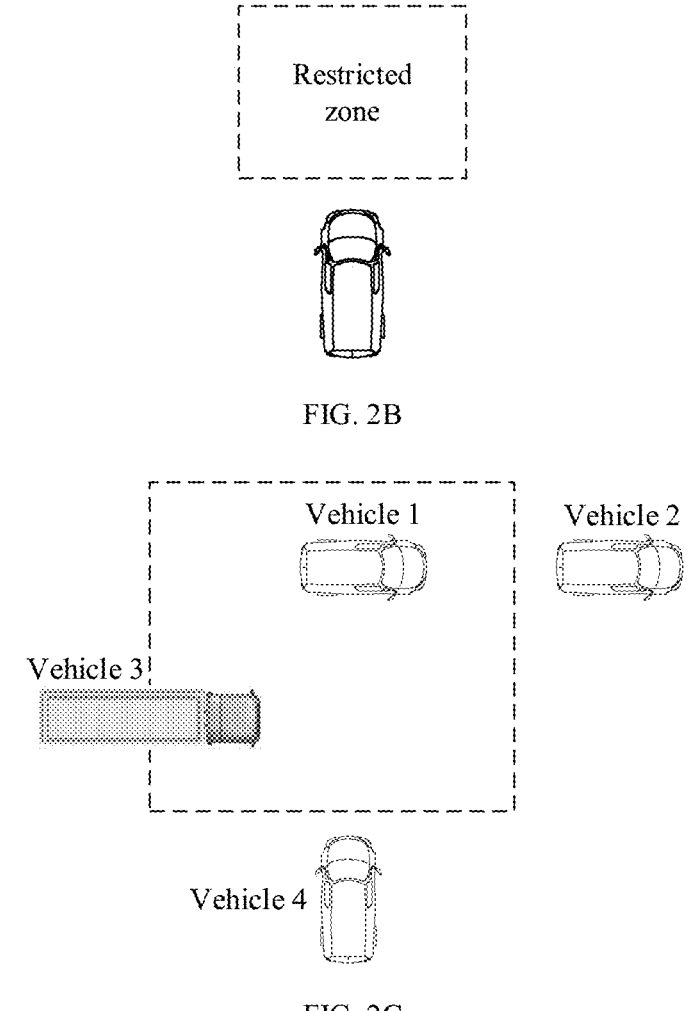

S301: A vehicle obtains information about an electronic fence, where the information about the electronic fence is determined based on one or more of vehicle information of the vehicle, information about a first task, lane information, and vehicle information of another vehicle S302: The vehicle executes the first task based on the information about the electronic fence

FIG. 3

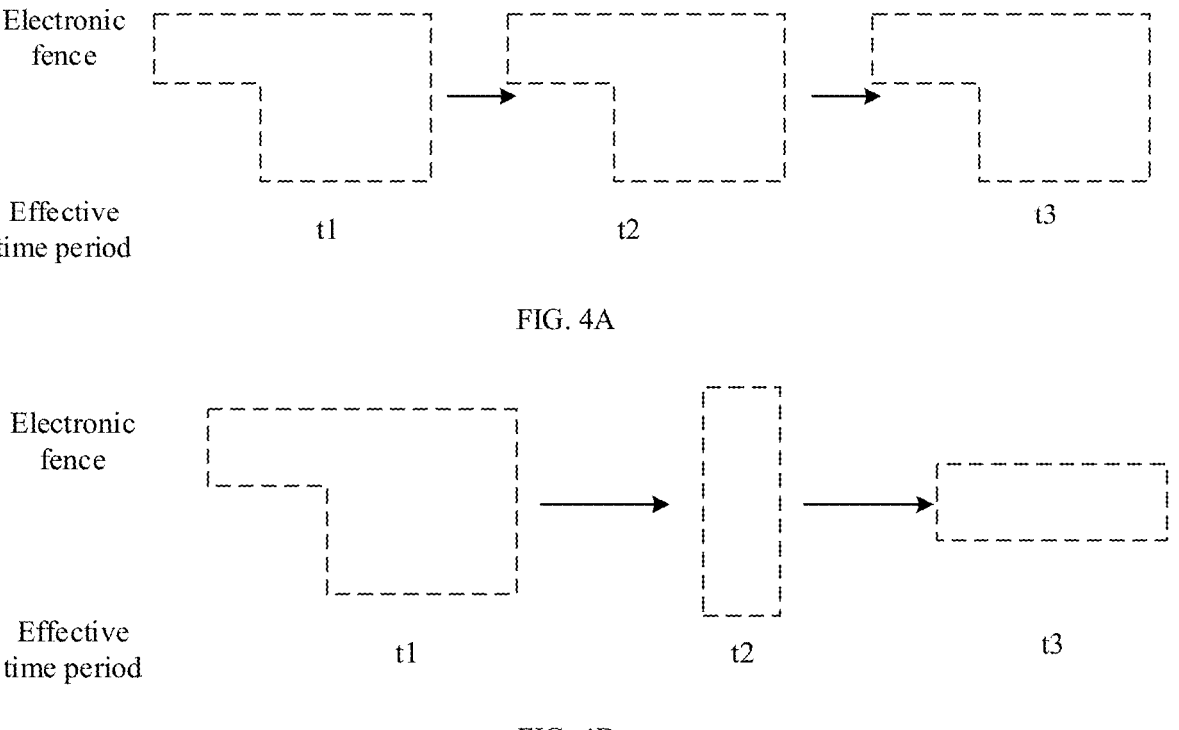
FIG. 4A
FIG. 4B
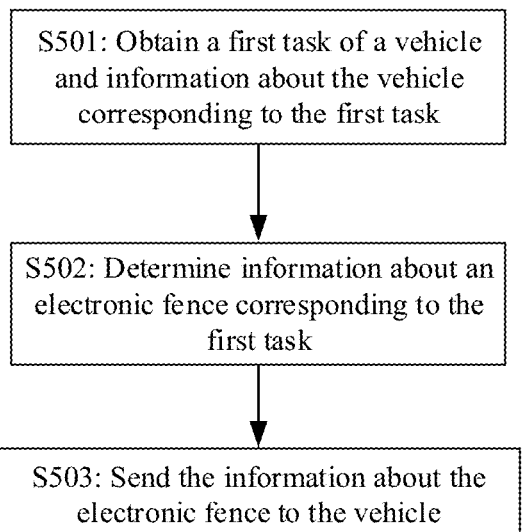
500
S501: Obtain a first task of a vehicle and information about the vehicle corresponding to the first task
S502: Determine information about an electronic fence corresponding to the first task
S503: Send the information about the electronic fence to the vehicle
FIG. 5

VEHICLE CONTROL METHOD, VEHICLE, AND SERVER

CROSS-REFERENCE TO RELATED APPLICATIONS

This is a continuation of International Patent Application No. PCT/CN2022/127467, filed on Oct. 25, 2022, which claims priority to Chinese Patent Application No. 202111240905.2, filed on Oct. 25, 2021. The disclosures of the aforementioned applications are hereby incorporated by reference in their entireties.

TECHNICAL FIELD

Embodiments of this disclosure relate to the field of intelligent driving technologies, and in particular, to a vehicle control method, a vehicle, and a server.

BACKGROUND

A vehicle needs to align with other systems in the field of cooperative driving, for example, during operation and charging tasks. During alignment, the vehicle needs to perform partial pose fine-tuning. To avoid affecting normal driving of another vehicle, constraints need to be imposed on an adjustable pose range of the vehicle. An existing pose fine-tuning manner is marking lines on the ground. However, in an actual operating environment, due to frequent movement of some devices, constraints fail to be imposed in this manner, which leads to a significant conflict between vehicles. It is difficult to ensure vehicle driving safety in this case.

Therefore, how to effectively ensure orderly operation and traffic of the vehicle and improve the vehicle driving safety is an urgent problem to be resolved.

SUMMARY

Embodiments of this disclosure provide a vehicle control method, a vehicle, and a server, to help ensure orderly operation and traffic of the vehicle and improve vehicle driving safety.

According to a first aspect, an embodiment provides a vehicle control method. The method may be applied to an entire vehicle, or a vehicle-mounted device in the vehicle, or a chip or another component in the vehicle.

The method includes steps wherein vehicle obtains information about an electronic fence, where the information about the electronic fence is determined based on one or more of vehicle information of the vehicle, information about a first task, lane information, and vehicle information of another vehicle, and the vehicle executes the first task based on the information about the electronic fence.

In this embodiment, the vehicle obtains the information about the electronic fence that is determined in consideration of the one or more of the vehicle information of the vehicle, the information about the first task of the vehicle, the lane information, and the vehicle information of the another vehicle, and adjusts a vehicle status based on the information about the electronic fence. This can implement flexible vehicle management by using the electronic fence, further ensures that the vehicle effectively completes the first task, ensures orderly operation and traffic of the vehicle, and improves vehicle driving safety.

For example, the solution may be applied to a production scenario like a port, a mine, or a closed (or semi-closed)

industrial park. In a corresponding scenario, the information about the electronic fence is determined based on the one or more of the vehicle information of the vehicle, the information about the first task of the vehicle, the lane information, and the vehicle information of the another vehicle. Vehicle behavior is restricted by using the electronic fence. A same electronic fence imposes different constraints on different types of vehicles, and different tasks correspond to different electronic fences. This helps implement flexible vehicle management by using the electronic fence, and can ensure orderly operation and traffic of the vehicle, and improve vehicle driving safety. The solution may further be applied to a passenger vehicle environment, for example, a high-speed toll station, a garage, a passenger station, or a parking lot. Vehicles are managed and scheduled using a same electronic fence, so that different vehicles pass or stop in an orderly manner. This helps ensure vehicle driving safety.

According to a second aspect, an embodiment provides a vehicle control method. The method may be applied to a vehicle control apparatus. The vehicle control apparatus may be an independent device, or may be a chip or a component in a device, or may be software, or may be deployed in a cloud, a road side device, a remote server, a local server, or the like. A product form and a deployment manner of the vehicle control apparatus are not limited in embodiments of this disclosure.

The method includes obtaining a first task of a vehicle and information about the vehicle corresponding to the first task, determining information about an electronic fence corresponding to the first task, and sending the information about the electronic fence to the vehicle.

In this embodiment, a server obtains the first task of the vehicle and the vehicle information corresponding to the first task, determines the information about the electronic fence, and sends the information about the electronic fence to the vehicle. In this example the electronic fence is determined based on the first task of the vehicle, and flexible vehicle management may be implemented by using the electronic fence. This can further ensure orderly operation and traffic of the vehicle, and improve vehicle driving safety.

With reference to the first aspect or the second aspect, in a possible implementation, the first task includes parking space division, zone traffic behavior, or vehicle alignment.

In this embodiment, different first tasks correspond to different electronic fences, helping implement flexible management of vehicles with different tasks.

With reference to the first aspect or the second aspect, the information about the electronic fence may be delivered by the server, or may be delivered by a vehicle having permission to generate the electronic fence, or a boundary of the electronic fence may be planned by another vehicle, uploaded to the server or a road side unit (RSU), and then delivered to a target vehicle.

In this embodiment, the information about the electronic fence may be delivered by any server, vehicle, or RSU that has a function of delivering the electronic fence. This effectively ensures implementation flexibility of this solution.

With reference to the second aspect, in a possible implementation, the determining information about an electronic fence corresponding to the first task includes determining the information about the electronic fence based on one or more of information about the first task, the vehicle information of the vehicle, lane information, and vehicle information of another vehicle.

With reference to the first aspect or the second aspect, in a possible implementation, the vehicle information includes at least one of maneuverability of the vehicle, an active safety distance of the vehicle, and route planning of the vehicle.

With reference to the first aspect or the second aspect, in a possible implementation, the information about the electronic fence includes time information.

With reference to the first aspect or the second aspect, in a possible implementation, the electronic fence is removed based on the time information.

In this embodiment, the information about the electronic fence includes time information. After an effective time period of the electronic fence ends, the electronic fence is removed, and no additional information needs to be delivered, further saving signaling.

With reference to the first aspect, in a possible implementation, indication information is obtained, where the information indicates to remove the electronic fence.

With reference to the second aspect, in a possible implementation, indication information is sent, where the information indicates to remove the electronic fence.

With reference to the first aspect or the second aspect, in a possible implementation, second indication information is obtained after the first task is completed, or the first task is canceled, or the effective time period of the electronic fence ends.

According to a third aspect, an embodiment provides a vehicle control method. The method may be applied to an entire vehicle, or a vehicle-mounted device in the vehicle, or a chip or another component in the vehicle. The method includes obtaining information about an electronic fence, executing, based on the information about the electronic fence, a first task corresponding to the electronic fence, obtaining indication information, where the indication information indicates time information of the electronic fence, and removing the electronic fence based on the indication information.

In this embodiment, the vehicle obtains the information about the electronic fence, so that the vehicle may implement flexible vehicle management by using the electronic fence and complete the first task. After the first task is completed, the electronic fence is removed by using the indication information. This can further ensure orderly operation or traffic of the vehicle, and improve vehicle driving safety.

According to a fourth aspect, an embodiment provides a vehicle control method. The method may be applied to an entire vehicle, or a vehicle-mounted device in the vehicle, or a chip or another component in the vehicle. The method includes: obtaining information about an electronic fence; executing, based on the information about the electronic fence, a first task corresponding to the electronic fence; and removing the electronic fence after the first task is completed or the first task is canceled.

In this embodiment, the vehicle obtains the information about the electronic fence by using first indication information, so that the vehicle may implement flexible vehicle management by using the electronic fence, complete the first task, and remove the electronic fence after the first task is completed. This can further ensure orderly operation and traffic of the vehicle, and improves vehicle driving safety.

According to a fifth aspect, an embodiment provides a vehicle control apparatus, where the apparatus includes an obtaining unit configured by a vehicle to obtain information about an electronic fence, where the information about the electronic fence is determined based on one or more of vehicle information of the vehicle, information about a first task, lane information, and vehicle information of another vehicle, and a determining unit, configured to execute, by the vehicle, the first task based on the information about the electronic fence.

According to a sixth aspect, an embodiment provides a vehicle control apparatus, where the apparatus includes an obtaining unit configured to obtain a first task of a vehicle, and information about the vehicle corresponding to the first task, a determining unit configured to determine information about an electronic fence corresponding to the first task, and a sending unit configured to send the information about the electronic fence to the vehicle.

With reference to the fifth aspect or the sixth aspect, in a possible implementation, the first task includes parking space division, zone traffic behavior, or vehicle alignment.

With reference to the fifth aspect or the sixth aspect, in a possible implementation, the information about the electronic fence may be delivered by the server, or may be delivered by a vehicle having permission to generate the electronic fence, or a boundary of the electronic fence may be planned by another vehicle, uploaded to the server or a road side unit RSU, and then delivered to a target vehicle.

With reference to the sixth aspect, in a possible implementation, the determining unit is further configured to determine the information about the electronic fence based on one or more of information about the first task, the vehicle information of the vehicle, lane information, and vehicle information of another vehicle.

With reference to the fifth aspect or the sixth aspect, in a possible implementation, the vehicle information includes at least one of maneuverability of the vehicle, an active safety distance of the vehicle, and route planning of the vehicle.

With reference to the fifth aspect or the sixth aspect, in a possible implementation, the information about the electronic fence includes time information.

With reference to the fifth aspect or the sixth aspect, in a possible implementation, the determining unit is further configured to remove the electronic fence based on the time information.

With reference to the fifth aspect, in a possible implementation, the obtaining unit is further configured to obtain indication information, where second information indicates to remove the electronic fence.

With reference to the sixth aspect, in a possible implementation, the sending unit is further configured to send indication information, where second information indicates to remove the electronic fence.

With reference to the fifth aspect or the sixth aspect, in a possible implementation, the second indication information is obtained after the first task is completed, or the first task is canceled, or an effective time period of the electronic fence ends.

According to a seventh aspect, an embodiment provides a vehicle control apparatus. The apparatus includes: an obtaining unit, configured to obtain first indication information, where the first indication information indicates an electronic fence; and a determining unit, configured to execute, based on the first indication information, a first task corresponding to the electronic fence. The obtaining unit is configured to obtain second indication information, where the second indication information indicates time information of the electronic fence. The determining unit is configured to remove the electronic fence based on the second indication information.

According to an eighth aspect, an embodiment provides a vehicle control apparatus. The apparatus includes: an obtaining unit, configured to obtain first indication information, where the first indication information indicates an electronic fence; and a determining unit, configured to execute, based on the first indication information, a first task corresponding to the electronic fence. The determining unit is configured to remove the electronic fence after the first task is completed or the first task is canceled.

According to a ninth aspect, an embodiment provides an apparatus. The apparatus includes a processor and a memory.

The memory is configured to store a program.

The processor is configured to execute the program stored in the memory, so that the apparatus performs the method according to any one of the first aspect, the third aspect, or the fourth aspect and the possible implementations of the first aspect, the third aspect, or the fourth aspect.

According to a tenth aspect, an embodiment provides an apparatus. The apparatus includes a processor and a memory.

The memory is configured to store a program.

The processor is configured to execute the program stored in the memory, so that the apparatus performs the method according to any one of the second aspect or the possible implementations of the second aspect.

According to an eleventh aspect, an embodiment provides a vehicle. The vehicle includes the apparatus according to the fifth aspect, the seventh aspect, or the eighth aspect.

According to a twelfth aspect, an embodiment provides a server. The server includes the apparatus according to the sixth aspect.

According to a thirteenth aspect, an embodiment provides a computer program product. The computer program product includes computer program code. When the computer program code runs on a computer, the computer is enabled to perform the method in the first aspect; or when the computer program code runs on a computer, the computer is enabled to perform the method in the second aspect; or when the computer program code runs on a computer, the computer is enabled to perform the method in the third aspect; or when the computer program code runs on a computer, the computer is enabled to perform the method in the fourth aspect.

It should be noted that all or some of the computer program code may be stored in a first storage medium. The first storage medium may be encapsulated together with a processor, or may be encapsulated separately from a processor. This is not limited in embodiments of this disclosure.

According to a fourteenth aspect, an embodiment provides a computer-readable medium. The computer-readable medium stores program code, and when the computer program code runs on a computer, the computer is enabled to perform the method in the first aspect, the second aspect, the third aspect, or the fourth aspect.

According to a fifteenth aspect, an embodiment provides a chip system. The chip system includes a processor, configured to invoke a computer program or computer instructions stored in a memory, so that the processor is enabled to perform the method in the first aspect and the possible designs of the first aspect, or perform the method in the second aspect and the possible designs of the second aspect, or perform the method in the third aspect and the possible designs of the third aspect, or perform the method in the fourth aspect and the possible designs of the fourth aspect.

With reference to the fifteenth aspect, in a possible implementation, the processor is coupled to the memory by using an interface.

With reference to the fifteenth aspect, in a possible implementation, the chip system further includes the memory, and the memory stores the computer program or the computer instructions.

According to a sixteenth aspect, an embodiment provides a processor. The processor is configured to invoke a computer program or computer instructions stored in a memory, so that the processor is enabled to perform the method in the first aspect and the possible designs of the first aspect, or perform the method in the second aspect and the possible designs of the second aspect, or perform the method in the third aspect and the possible designs of the third aspect, or perform the method in the fourth aspect and the possible designs of the fourth aspect.

According to a seventeenth aspect, an embodiment provides a vehicle control system. The system includes the vehicle according to the eleventh aspect and the server according to the twelfth aspect.

BRIEF DESCRIPTION OF DRAWINGS

FIG. 2A to FIG. 2C are schematic diagrams of vehicle electronic fences according to an embodiment;

FIG. 3 is a schematic flowchart of a vehicle control method according to an embodiment;

FIG. 4A and FIG. 4B are schematic diagrams of effective time periods of electronic fences according to an embodiment;

FIG. 5 is a schematic flowchart of a vehicle control method according to an embodiment;

DESCRIPTION OF EMBODIMENTS

The following describes the technical solutions in embodiments of this disclosure with reference to the accompanying drawings.

Figure 1:
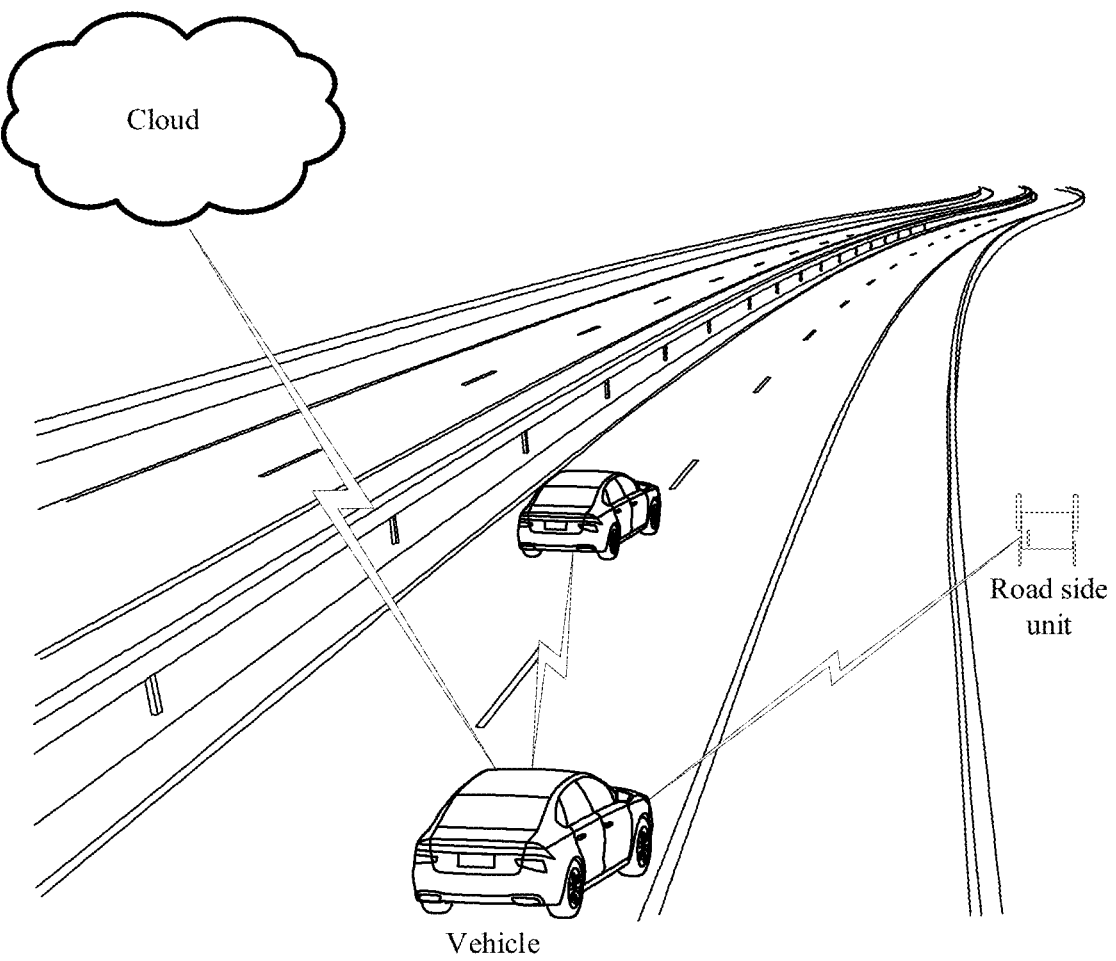
FIG. 1 is a schematic diagram of a vehicle communication system according to an embodiment.

FIG. 1 is a schematic diagram of a vehicle communication system according to an embodiment. The communication system includes a vehicle and a server side. As shown in FIG. 1, the server side may be a cloud, and the cloud may include a cloud server and/or a cloud virtual machine. The server side may communicate with a vehicle, and provide a plurality of services for the vehicle, for example, an over the air (OTA) upgrade service, a high-definition map service, and an autonomous driving or assisted driving service.

The vehicle may interact with the cloud. This can improve an autonomous driving or assisted driving function, and improve safety and driving efficiency of the vehicle. For example, the vehicle may collect road surface information and surrounding vehicle information by using a sensing apparatus installed on the vehicle, and upload the collected information to the cloud. The cloud performs driving algorithm training in different scenarios based on the collected information, continuously optimizes a driving algorithm as training data is updated, and updates the driving algorithm to the vehicle. This can continuously improve an autonomous driving capability of the vehicle to adapt to various scenarios. For another example, for a neural network-based image processing algorithm used by a sensing apparatus, training of the image processing algorithm may be completed on the cloud, and is updated with update of training data. Correspondingly, the vehicle may obtain the updated image processing algorithm from the cloud, to improve an image processing capability of the sensing apparatus. For another example, in bad weather, the vehicle may obtain weather information and road traffic accident information by using the cloud, to assist the vehicle in planning. This improves driving efficiency, and reduces a risk of an accident of the vehicle. Alternatively, the cloud may send real-time road information, for example, traffic light information, to the vehicle. In this case, the vehicle may receive a traffic light change interval at a front intersection in advance, and calculate a time period spent by the vehicle to pass based on a current vehicle speed, to determine an appropriate and safe passing occasion and plan a driving speed of the vehicle. This can reduce vehicle energy consumption, and improve driving safety.

The vehicle may exchange information with the cloud in a wireless communication manner. The wireless communication may comply with a wireless protocol of a network accessed by the vehicle, for example, cellular network-based vehicle-to-everything (V2X) (C-V2X) communication. The cellular network is, for example, a Long-Term Evolution (LTE) wireless network, or a 5th generation (5G) wireless network.

The communication system may further include a road side unit (RSU). The road side unit may be installed on a road side, and may communicate with the cloud and the vehicle. A road side unit communicating with the cloud may be considered as a terminal apparatus similar to the vehicle. A road side unit communicating with the vehicle may be considered as a terminal apparatus similar to the vehicle, or may be considered as a server side apparatus of the vehicle. The road side unit may interact with the vehicle or the cloud in the wireless communication manner. When communicating with the vehicle, the road side unit may use a dedicated short range communication (DSRC) technology, or may use the C-V2X communication, for example, based on the LTE communication protocol or the 5G communication protocol. Communication with the cloud may be performed by using the C-V2X communication, for example, based on the LTE communication protocol or the 5G communication protocol. The road side unit may provide a service for the vehicle, for example, implement vehicle identification, electronic toll collection, and electronic score deduction. A sensing apparatus may be installed in the road side unit, to collect road information and provide a vehicle-road cooperative service. The road side unit may be connected to a road side traffic sign (for example, an electronic traffic light or an electronic speed limit sign), to implement real-time control on the traffic light or the speed limit sign, or may provide the road information to the vehicle directly or by using the cloud. This improves an autonomous driving or assisted driving function.

In the system shown in this embodiment, the server side may be an internet of vehicles platform or an internet of vehicles server that manages an internet of vehicles terminal. For example, the server side is configured to: receive information sent by the vehicle, and calculate and generate an electronic fence. The vehicle is used to report task information and a vehicle type to the server side. Each vehicle includes a communication module and a processing module, configured to receive a signal sent by the server side, and control starting and stopping of the vehicle based on the signal and a preset program. The server may be one or more independent servers or a server cluster, or may be a cloud platform service deployed on the cloud.

It should be noted that a vehicle control method in an embodiment may be applied to an internet of vehicles, for example, V2X, an LTE vehicle (LTE-V) technology, or vehicle to vehicle V2V. For example, the method may be applied to a vehicle having a driving movement function, or another apparatus having the driving movement function in the vehicle. The another apparatus includes but is not limited to another sensor like a vehicle-mounted terminal, a vehicle-mounted controller, a vehicle-mounted module, a vehicle-mounted component, a vehicle-mounted part, a vehicle-mounted chip, a vehicle-mounted unit, a vehicle-mounted radar, or a vehicle-mounted camera. The vehicle may implement the vehicle control methods provided in embodiments of this disclosure by using the vehicle-mounted terminal, the vehicle-mounted controller, the vehicle-mounted module, the vehicle-mounted component, the vehicle-mounted part, the vehicle-mounted unit, the vehicle-mounted radar, or the vehicle-mounted camera. Certainly, the control solutions in embodiments of this disclosure may be further applied to an intelligent terminal having a movement control function other than the vehicle, or disposed in an intelligent terminal having a movement control function other than the vehicle, or disposed in a component of an intelligent terminal. The intelligent terminal may be an intelligent transportation device, a smart home device, a robot, or the like, for example, including but not limited to an intelligent terminal or another sensor like a controller, a chip, a radar, or a camera in the intelligent terminal, another component, or the like.

Moreover, it should be noted that, in embodiments of this disclosure, "at least one" means one or more, and "a plurality of" means two or more. "And/or" describes an association relationship between associated objects, and indicates that three relationships may exist. For example, A and/or B may represent the following cases: Only A exists, both A and B exist, and only B exists. A and B each may be singular or plural. The character "/" generally indicates an "or" relationship between the associated objects. "At least one of the following items" or a similar expression thereof means any combination of these items, including a singular item or any combination of plural items. For example, at least one of a, b, or c may indicate a, b, c, a and b, a and c, b and c, or a, b, and c, where a, b, and c may indicate a singular or plural form.

In addition, unless otherwise stated, ordinal numbers such as "first" and "second" mentioned in embodiments are intended to distinguish a plurality of objects, rather than limit priorities or importance degrees of the plurality of objects. For example, a first electronic fence and a second electronic fence are merely used to distinguish different electronic fences, but do not indicate different priorities, importance degrees, or the like of the electronic fences.

The following explains terms in embodiments of this disclosure.

1. Maneuverability

The maneuverability of a vehicle is a capability of the vehicle to overcome an obstacle in a complex road and a roadless zone and to make a turn in a smallest area. The maneuverability of the vehicle is related to an inherent attribute of the vehicle. The inherent attribute of the vehicle may include one or more of the following: size information such as a vehicle type, a vehicle height, and a vehicle width, maneuverability information such as a minimum turning radius and a maximum climbing gradient, license plate information (in some scenarios in which traffic is restricted based on a license plate, for example, an end number of the license plate, or a region or a province to which the vehicle belongs), and the like. Based on such information, whether a road meets a vehicle driving condition may be determined from a perspective of the vehicle, for example, a restriction on a large vehicle, a height limit, a width limit, a sharp turn, or a steep gradient.

2. Active Safety Distance

A vehicle needs to ensure a safe distance from another vehicle during driving, and the distance is referred to as the active safe distance. The active safety distance ensures that the vehicle is not triggered to decelerate or stop.

3. Electronic Fence

The electronic fence is a boundary of a geographical or spatial zone, and is used to define a range of the geographical or spatial zone and restrict behavior of a vehicle or another movable object in the zone. For example, a traffic rule of the electronic fence may be defined to restrict the behavior of the vehicle or the another movable object in the zone. In embodiments of this disclosure, the electronic fence may be understood as information about point set including a plurality of points. Each point may be represented by geographical coordinates or spatial coordinates, or may be represented by a point identifier, or the like. The electronic fence may also be referred to as a virtual fence, a geo-fence, or the like. The electronic fence may be a regular graph, like a rectangle or a circle, or may be an irregular graph, like an irregular polygon. In addition, graphs corresponding to the electronic fence at different moments may be the same or different. This is not limited in embodiments of this disclosure.

It may be understood that information about the electronic fence may be determined by the server, or may be determined by a vehicle having permission to generate the electronic fence, or may be determined by the road side unit RSU. After the information about the electronic fence is determined, the information may be delivered by using the server, the RSU, or the vehicle having the permission. For example, if a device that determines the electronic fence can directly communicate with the vehicle, the device directly delivers the information about the electronic fence to the vehicle, or may deliver the information about the electronic fence to the vehicle by using another device that can communicate with the vehicle. For example, after determining the information about the electronic fence, the vehicle having the permission to generate the electronic fence reports the information to the cloud server or the RSU, and then delivers the information to the vehicle. A delivering manner may be a broadcast manner, or may be a V2V manner. This is not limited in embodiments of this disclosure.

In embodiments, a traffic rule of the zone defined by the electronic fence corresponds to a task type, and traffic rules for different task types of vehicles are the same or different; or a traffic rule of the zone defined by the electronic fence corresponds to a vehicle type, and traffic rules for different types of vehicles are the same or different.

Figure 2:
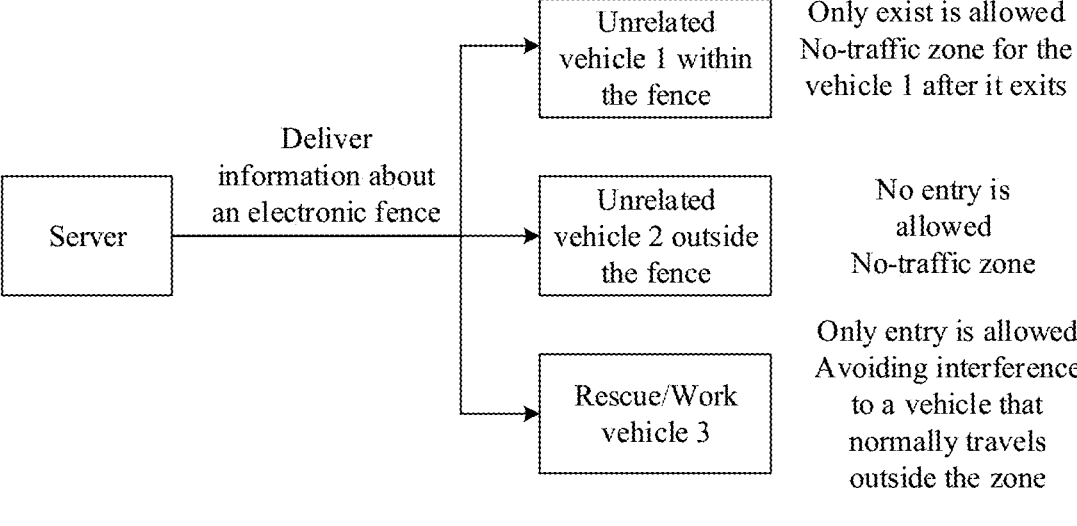
FIG. 2 is a schematic diagram of defining a vehicle traffic rule by an electronic fence according to an embodiment.

The traffic rule of the zone defined by the electronic fence corresponds to the task type. For example, with reference to FIG. 2, no corresponding task is allocated to an unrelated vehicle 1 within the fence, and a traffic rule for the vehicle 1 is that only exit is allowed. After the vehicle 1 exits, such zone defined by the fence is a no-traffic zone for the vehicle 1. No corresponding task is allocated to an unrelated vehicle 2 outside the fence, and a traffic rule for the vehicle 2 is that no entry is allowed. The zone is a no-traffic zone for the vehicle 2 outside the electronic fence. A vehicle 3 with a rescue or work task can only enter and work in the zone defined by the electronic fence, to avoid interference to a vehicle that normally travels outside the zone. A task type corresponding to the vehicle 3 is to enter the zone defined by the electronic fence to perform rescue work. It may be understood that, after the vehicle 1 exits, the traffic rule corresponding to the vehicle 1 is the same as that corresponding to the vehicle 2, and neither the vehicle 1 nor the vehicle 2 is allowed to enter. The zone defined by the electronic fence is the no-traffic zone for both the vehicle 1 and the vehicle 2. In this case, task types corresponding to the vehicle 1 and the vehicle 2 are not allowed to enter the zone defined by the electronic fence.

The traffic rule of the zone defined by the electronic fence corresponds to the vehicle type. In a possible case, the electronic fence has a same traffic rule for all types of vehicles. After receiving the information about the electronic fence, the vehicle performs a same action based on a virtual range defined by the electronic fence. For example, the zone defined by the electronic fence is a no-traffic zone for all vehicles and is not allowed to enter. When approaching the no-traffic zone, the vehicle performs an operation like stopping, making a U-turn, or turning, to avoid entering the no-traffic zone. In another possible case, the electronic fence has different traffic rules for different types of vehicles. In other words, after receiving the information about the electronic fence, the different types of vehicles perform different actions based on virtual ranges defined by the electronic fence. For example, for an emergency, the vehicles are classified into a common vehicle and a rescue vehicle. The common vehicle within the electronic fence has permission to exit the electronic fence. Once the common vehicle exits the electronic fence, the common vehicle cannot enter a range defined by the electronic fence, and the rescue vehicle outside the electronic fence may enter the range defined by the electronic fence to process the emergency.

It may be understood that, for the traffic rule of the zone defined by the electronic fence, the task type and the vehicle type may also be comprehensively considered. An alternative manner may be embodied in combination with the foregoing embodiments, and details are not described herein again.

Figure 2A:
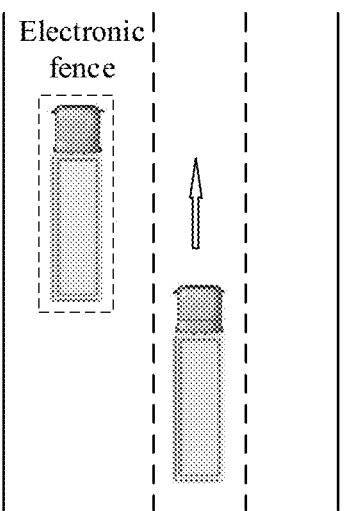

With reference to FIG. 2A to FIG. 2C, the following describes a possible form of the electronic fence in this embodiment, and an impact scope of the electronic fence on the vehicle. It may be understood that FIG. 2A to FIG. 2C are merely examples, and do not constitute a limitation on the electronic fence. The electronic fence in this embodiment may alternatively have another form.

With reference to FIG. 2A, a dashed line part is an electronic fence. In a possible example, in a commercial vehicle scenario like a dock, a port, or a mine, during multi-vehicle cooperative operation, a vehicle having autonomous behavior is separated from another vehicle by using the electronic fence. After the separation, the ego vehicle performs an operation like vehicle alignment or vehicle fine-tuning based on a range defined by the electronic fence. In this case, the zone is a no-traffic zone for the another vehicle, or a range of vehicle posture adjustment is defined by using the electronic fence, further ensuring vehicle driving safety.

With reference to FIG. 2B, a dashed line part is an electronic fence, and the electronic fence is used to define a no-traffic zone. In a possible example, for example, in a passenger vehicle scenario, the no-traffic zone is defined by using the electronic fence on a city road. When a vehicle is close to the no-traffic zone, the vehicle notifies a vehicle owner of the zone as the no-traffic zone by using a message, so that the vehicle owner avoids entering the zone in a timely manner and the vehicle is away from the zone.

With reference to FIG. 2C, a dashed line part is an electronic fence, and the electronic fence is used to define traffic rules for different types of vehicles. In a possible example, for an emergency, a cloud calculates the electronic fence and determines a traffic mode of a task-associated vehicle. The traffic mode includes but is not limited to the following ones. In one mode, a common vehicle unrelated to a task is only allowed to exit, and a zone defined by the electronic fence is a no-traffic zone after the vehicle exits. This vehicle is an unrelated vehicle within the electronic fence. As shown by a vehicle 1 in FIG. 2C, a traffic rule corresponding to the vehicle 1 is exit. When the vehicle 1 exits the electronic fence and reaches a position of a vehicle 2, the zone defined by the electronic fence is the no-traffic zone. In this case, a traffic rule corresponding to the vehicle 2 is that no entry is allowed. In another mode, a common vehicle unrelated to a task is not allowed to enter, that is, a zone defined by the electronic fence is a no-traffic zone, and this type of vehicle is the unrelated vehicle outside the fence. As shown by a vehicle 4 in FIG. 2C, the vehicle 4 is a vehicle unrelated to a task, and a traffic rule corresponding to the vehicle 4 is that no entry is allowed. In still another mode, a vehicle is only allowed to enter, to avoid interference to a vehicle that normally travels outside a zone defined by the electronic fence. Such type of vehicle is usually a rescue vehicle or a work vehicle, as shown by a vehicle 3 in FIG. 2C. After entering the zone defined by the electronic fence, this type of vehicle performs rescue work based on a task type.

An embodiment provides a vehicle control method. The method includes: A vehicle obtains information about an electronic fence, where the information about the electronic fence is determined based on one or more of vehicle information of the vehicle, information about a first task, lane information, and vehicle information of another vehicle; and the vehicle executes the first task based on the information about the electronic fence. In this embodiment, the information about the electronic fence obtained by the vehicle is determined based on the one or more of the vehicle information of the vehicle, the information about the first task of the vehicle, the lane information, and the vehicle information of the another vehicle, and adjusts a vehicle status based on the information about the electronic fence. This can implement flexible vehicle management by using the electronic fence, further ensures that the vehicle effectively completes the first task, ensures orderly operation and traffic of the vehicle, and improves vehicle driving safety.

The following describes steps in this embodiment with reference to an example of an embodiment.

FIG. 3 is a schematic flowchart of a vehicle control method according to an embodiment. The method may be applied to an entire vehicle, or a vehicle-mounted device in the vehicle, or a chip or another component in the vehicle. As shown in FIG. 3, the vehicle control method 300 includes but is not limited to the following steps.

S301: A vehicle obtains information about an electronic fence, where the vehicle may be a target vehicle.

The target vehicle may obtain the information about the electronic fence from a server, or obtain the information about the electronic fence from a vehicle having permission to generate the electronic fence, or obtain the information about the electronic fence from a road side unit RSU.

For example, the target vehicle obtains the information about the electronic fence from the server. The target vehicle may actively send a request for obtaining the electronic fence to the server, and the server delivers the information about the electronic fence based on the request of the target vehicle. Alternatively, a request for obtaining the electronic fence may be triggered by a third party like a map, platform software, or manual input of an operator, and the server obtains the information about the electronic fence based on the third-party request.

For example, the target vehicle obtains the information about the electronic fence from the vehicle having the permission to generate the electronic fence. The target vehicle actively sends the request for obtaining the electronic fence to the vehicle having the permission to generate the electronic fence, and the vehicle having the permission to generate the electronic fence sends the information about the electronic fence to the target vehicle based on the request. Alternatively, the vehicle having the permission to generate the electronic fence may be a leading vehicle in a vehicle fleet. When finding that the target vehicle has a requirement, the leading vehicle may notify the target vehicle, and actively deliver the electronic fence, to ensure overall safety of the vehicle fleet.

For example, the target vehicle obtains the information about the electronic fence from the RSU. The target vehicle actively sends the request for obtaining the electronic fence to the RSU, and the RSU sends the information about the electronic fence to the target vehicle based on the request.

It may be understood that the foregoing manner of obtaining the information about the electronic fence may alternatively be: The target vehicle initiates the request to the server, the server delivers the information about the electronic fence to the RSU, and then the RSU delivers the information about the electronic fence to the target vehicle. The manner of obtaining the electronic fence is not limited in embodiments of this disclosure. The following uses an example in which the information about the electronic fence is delivered by the server for detailed description.

Optionally, the information about the electronic fence includes time information.

The time information may indicate an effective time period of the electronic fence.

Optionally, the time information may include one or more effective time periods. FIG. 4A and FIG. 4B are schematic diagrams of effective time periods of electronic fences according to an embodiment. It is assumed that the effective time periods of the electronic fence are t1, t2, and t3. In different effective time periods, the electronic fences may be the same or different.

In a possible implementation, the electronic fences are same in the different effective time periods. As shown in FIG. 4A, a dashed box is an electronic fence, and electronic fences corresponding to t1, t2, and t3 are the same. In other words, zones of the electronic fences are static in different time periods. It can be learned that in this implementation, the zones of the electronic fences in the effective time period are static and remain unchanged.

In another possible implementation, the electronic fences are different in the different effective time periods, that is, information about the electronic fence includes a group of electronic fences, and the group of electronic fences has different effective time periods. As shown in FIG. 4B, a dashed box is an electronic fence, t1 corresponds to a first electronic fence, t2 corresponds to a second electronic fence, and t3 corresponds to a third electronic fence. The first electronic fence is different from the second electronic fence, and the second electronic fence is different from the third electronic fence. It can be learned that in this implementation, the electronic fences are dynamically changeable in different time periods.

In another possible implementation, the information about the electronic fence may be extended in a corresponding effective time period. For example, if a target vehicle does not complete a first task in a first effective time period, the vehicle sends, to a cloud based on an actual time period required for completing the first task, a request for extending the effective time period of the electronic fence, to request to extend the effective time period of the electronic fence; or a cloud delivers, to the vehicle based on a task completion status of the target vehicle, an instruction for extending the electronic fence. It may be understood that, in this implementation, the information about the electronic fence may not be repeatedly sent, and only time information for extending the electronic fence needs to be sent.

It may be understood that in the foregoing implementation, the information about the electronic fence may be a plurality of messages, or may be different corresponding fields in one message. In other words, the information about the electronic fence with the same effective time period or the different effective time periods may be sent by using one message, and in this case, may be indicated by using the different fields of the message; or may be sent by using the plurality of messages, and each message corresponds to information about one electronic fence.

Optionally, the time information includes start time, or both start time and effective duration, or start time and end time, or both end time and effective duration, or a periodic time interval, or a combination of any two or more of the foregoing manners. This is not limited in embodiments of this disclosure.

For example, the information about the electronic fence is determined based on one or more of vehicle information of the vehicle, information about the first task, lane information, and vehicle information of another vehicle.

In a possible implementation, the information about the electronic fence is determined based on the information about the vehicle. For example, in a production scenario like a port, a mine, or a closed (or semi-closed) industrial park, the vehicle usually needs to be accurately adjusted. In this case, when the information about the electronic fence is determined, size information such as a vehicle type, a vehicle height, and a vehicle width, and vehicle information such as a minimum turning radius is fully considered, to help implement accurate vehicle control.

In a possible implementation, the information about the electronic fence is determined based on the information about the first task. For example, in some production scenarios or emergency scenarios, a target zone usually needs to be divided to ensure orderly operation of some vehicles or implement emergency rescue. In this case, the information about the electronic fence is determined based on the information about the first task. In other words, an effective zone of the first task is defined by using the electronic fence, to help ensure orderly operation or orderly rescue.

In a possible implementation, the information about the electronic fence is determined based on the lane information. For example, in a scenario like road repair or roadbed damage, a related road section is usually divided based on the lane information, the information about the electronic fence is generated based on the lane information, and the vehicle is notified of the information about the electronic fence, to help ensure traffic efficiency and traffic safety.

In a possible implementation, the information about the electronic fence is determined based on the vehicle information of the another vehicle. For example, in a scenario like an intersection, when a traffic rule of the target vehicle is defined by using the information about the electronic fence, the vehicle information of the another vehicle needs to be fully considered. For example, a vehicle passing through this zone or a vehicle that may meet the target vehicle is notified in advance to effectively perform avoidance, and ensure driving safety.

It may be understood that the information about the electronic fence may be determined based on one or a combination of the foregoing possible implementations. For a an implementation, refer to the foregoing descriptions. This is not limited in embodiments of this disclosure.

It may be understood that information about electronic fences corresponding to different vehicle types may be different, and/or electronic fences corresponding to information about different first tasks may also be different, and/or different electronic fences may have different behavior restrictions on different vehicles. This is not limited in embodiments of this disclosure.

Optionally, the vehicle information includes at least one of maneuverability of the vehicle, an active safety distance of the vehicle, and route planning of the vehicle.

In a possible implementation, the vehicle information includes the maneuverability of the vehicle, and a server determines the information about the electronic fence based on maneuverability information reported by the target vehicle. It may be understood that a minimum effective zone of the electronic fence is determined by using the maneuverability of the vehicle, to ensure that the vehicle has at least one drivable route from a start point to an end point within the electronic fence.

For example, in a scenario in which the target vehicle passes through an intersection, the server cannot provide precise guidance for the target vehicle. In this case, the electronic fence is delivered based on the maneuverability of the vehicle, the target vehicle is allowed to travel in a zone defined by the electronic fence, and a vehicle outside the electronic fence cannot enter the zone. This further effectively ensures driving safety of the target vehicle. In a possible implementation, the vehicle information includes the active safety distance of the vehicle, and the server determines the information about the electronic fence based on the active safety distance reported by the target vehicle. A zone, of the electronic fence, determined based on the active safety distance of the target vehicle is a minimum effective zone, and the minimum effective zone can ensure that the target vehicle has at least one drivable route from a start point to an end point within the electronic fence. For example, after the target vehicle is locked, based on the active safety distance of the target vehicle and the information about the electronic fence delivered by the server, all directions of the target vehicle are in the active safety distance of the target vehicle, effectively ensuring safety of the target vehicle. Optionally, the server may alternatively determine the information about the electronic fence based on an active safety distance reported by the another vehicle, and a zone of the electronic fence determined based on the active safety distance of the another vehicle is a maximum effective zone. The maximum effective zone helps reduce interference caused by the electronic fence to normal driving of the another vehicle.

In a possible implementation, the vehicle information includes the route planning of the vehicle, and the server determines the information about the electronic fence based on the route planning reported by the target vehicle. A zone, of the electronic fence, determined based on the route planning reported by the target vehicle is a minimum effective zone, and the minimum effective zone can ensure that the vehicle has at least one drivable route from a start point to an end point within the electronic fence. For example, when executing a task, to avoid interference from the another vehicle, the target vehicle reports route planning information of the target vehicle to the server, and the server delivers the information about the electronic fence to the target vehicle based on the route planning information. The electronic fence isolates the target vehicle from the another vehicle, to effectively ensure quick and effective operation of the target vehicle and safety of all vehicles. Optionally, the server may alternatively determine the information about the electronic fence based on route planning reported by the another vehicle, and determine that a zone of the electronic fence determined based on the route planning reported by the another vehicle is a maximum effective zone. The maximum effective zone helps reduce interference caused by the electronic fence to normal driving of the another vehicle.

It may be understood that the information for determining the electronic fence includes the time information, and the time information can fully ensure that the target vehicle completes the first task in the zone defined by the electronic fence, or ensure that the target vehicle passes through a driving route. In a possible implementation, the vehicle information includes the active safety distance of the vehicle and the route planning of the vehicle, and the server determines the information about the electronic fence based on the active safety distance of the vehicle and the route planning of the vehicle. For example, when the target vehicle is charged in the zone defined by the electronic fence, the target vehicle is accurately aligned with a charging gun. Because the active safety distance of the target vehicle is fully considered during determining of the electronic fence of the target vehicle, the target vehicle is not interfered by the another vehicle, to ensure smooth charging of the target vehicle. The electronic fence enables a vehicle outside the defined zone to replan a route or change a driving route.

It may be understood that, in this embodiment, the information about the electronic fence may be determined based on the vehicle information of the target vehicle or the vehicle information of the another vehicle, or may be determined based on the vehicle information of the target vehicle and the vehicle information of the another vehicle. This effectively ensures accurate management of the vehicle by using the electronic fence, further ensures that the vehicle effectively completes the first task, ensures orderly operation and traffic of the vehicle, and improves vehicle driving safety. The information about the electronic fence may be determined in any one or a combination of the foregoing forms. This is not limited in embodiments of this disclosure.

S302: The vehicle executes the first task based on the information about the electronic fence.

Optionally, the first task includes but is not limited to parking space division, zone traffic behavior, or vehicle alignment.

It may be understood that the server completes parking space division, zone traffic behavior, or vehicle alignment by delivering the electronic fence, and the vehicle completes parking, zone traffic behavior, or vehicle alignment based on assistance of the information about the electronic fence.

Optionally, the vehicle removes the electronic fence based on the time information.

The time information may be time at which the first task is completed, time at which the first task is canceled, or time after the effective time period of the electronic fence ends, that is, the electronic fence is automatically removed after this time ends. The time information is carried in the information about the electronic fence, and no additional information needs to be delivered. This saves signaling.

Optionally, the vehicle obtains indication information, where the indication information indicates to remove the electronic fence.

Optionally, the indication information is delivered after the first task is completed, or the first task is canceled, or the effective time period of the electronic fence ends. The vehicle removes the electronic fence based on the indication information.

FIG. 5 is a schematic flowchart of a vehicle control method according to an embodiment. The method is applied to a server, or an RSU, or a vehicle having permission to deliver an electronic fence. In this embodiment, the method is applied to the server. As shown in FIG. 5, the vehicle control method 500 includes but is not limited to the following steps.

S501: The server obtains a first task of a vehicle and information about the vehicle corresponding to the first task.

Optionally, the first task includes parking space division, zone traffic behavior, or vehicle alignment.

S502: The server determines information about an electronic fence corresponding to the first task.

Optionally, that the server determines information about an electronic fence corresponding to the first task includes: determining the information about the electronic fence based on one or more of information about the first task, the vehicle information of the vehicle, lane information, and vehicle information of another vehicle.

Optionally, the vehicle information includes at least one of maneuverability of the vehicle, an active safety distance of the vehicle, and route planning of the vehicle.

Optionally, the information about the electronic fence includes time information.

Optionally, the server sends indication information to the vehicle, where the indication information indicates to remove the electronic fence.

The indication information is obtained after the first task is completed, or the first task is canceled, or an effective time period of the electronic fence ends.

S503: The server sends the information about the electronic fence to the vehicle.

It may be understood that, for descriptions of the first task, the information about the electronic fence, and a related process in this embodiment, refer to the embodiment shown in FIG. 4. Details are not described herein again.

Figure 6:
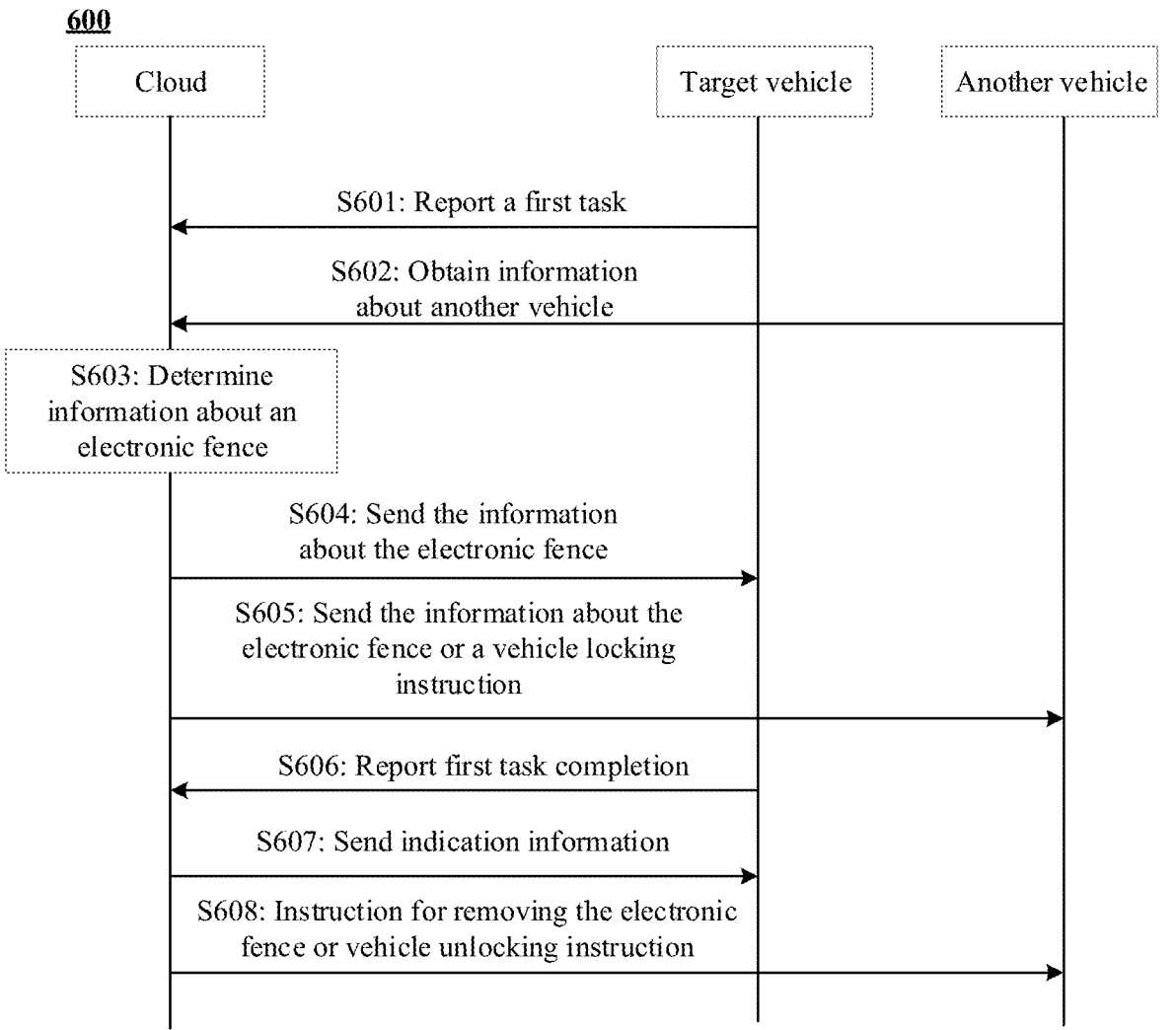
FIG. 6 is a schematic interaction flowchart of a vehicle control method according to an embodiment.

FIG. 6 is a schematic flowchart of a vehicle control method according to an embodiment of this disclosure. As shown in FIG. 6, the method 600 includes but is not limited to the following steps.

S601: A target vehicle reports a first task to a cloud. The first task includes parking space division, zone traffic behavior, or vehicle alignment.

The first task may be actively reported by the target vehicle to the cloud, or may be determined by the cloud by analyzing data of the target vehicle and/or an onsite sensor and based on the analyzed data, or may be obtained from a third-party platform or software like a map, or may be manually input by an operator.

Optionally, the first task is an event in a normal procedure or an event in an abnormal procedure.

In a possible implementation, the first task may be the event in the normal procedure. For example, the target vehicle is accurately aligned with a charging gun during charging, to ensure smooth charging; or the target vehicle is aligned with a gantry crane in a port scenario, to ensure accurate loading and unloading of goods.

In another possible implementation, the first task may be the event in the abnormal procedure. For example, if the target vehicle stops abnormally, the cloud cannot plan an effective starting road for the target vehicle. The target vehicle autonomously travels to a place, and then the cloud delivers planned route information.

S602: The cloud obtains information about another vehicle.

The information about the another vehicle includes but is not limited to position information, speed information, current route planning information, and future route planning information of the another vehicle.

S603: The cloud determines information about an electronic fence.

In this embodiment, a main function of the electronic fence is to isolate the target vehicle from the another vehicle, and grant specific autonomous driving permission to the target vehicle in an effective time period of the electronic fence.

Optionally, the information about the electronic fence is determined based on one or more of vehicle information of the vehicle, information about the first task, lane information, and vehicle information of the another vehicle.

Optionally, the vehicle information includes at least one of maneuverability of the vehicle, an active safety distance of the vehicle, and route planning of the vehicle.

Optionally, the information about the electronic fence includes time information. The electronic fence is removed based on the time information after the first task is completed.

S604: The cloud sends the information about the electronic fence to the target vehicle.

For the target vehicle, a traffic rule of the electronic fence is that the target vehicle can travel only within the electronic fence.

S605: The cloud sends the information about the electronic fence or a vehicle locking instruction to the another vehicle.

In a possible implementation, if the electronic fence may interfere with driving of the another vehicle, the information about the electronic fence needs to be delivered to these vehicles, to notify that a traffic rule of the other vehicles is that the other vehicles can only travel outside the fence. This is similar to a no-traffic zone.

In a possible implementation, for the another vehicle, if the electronic fence is located on a road that the another vehicle needs to pass through, the vehicle locking instruction is delivered to the another vehicle. The vehicle locking instruction is to enable the another vehicle to reject an instruction other than the vehicle locking instruction in a vehicle locking period, to avoid a conflict when the another vehicle moves.

S606: The target vehicle reports first task completion information. The first task completion information may be actively reported by the target vehicle to the cloud, or may be reported by the cloud by analyzing data of the target vehicle and/or an onsite sensor and based on the analyzed data, or may be obtained from a third-party platform or software like a map, or may be manually input by an operator. This is not limited in embodiments of this disclosure.

S607: The cloud sends indication information to the target vehicle, where the indication information indicates to remove the electronic fence.

S608: The cloud delivers, to the another vehicle, an instruction for removing the electronic fence or a vehicle unlocking instruction. In other words, after the target vehicle completes the task, the electronic fence corresponding to the target vehicle and the vehicle locking instruction corresponding to the another vehicle are also correspondingly removed.

It may be understood that, for descriptions of the information about the electronic fence, the information about the first task, and a related process in this embodiment, refer to the embodiment shown in FIG. 4. Details are not described herein again.

With reference to FIG. 7 to FIG. 10, the following describes in detail the vehicle alignment, zone traffic behavior, and parking space division included in the first task.

Figure 7:
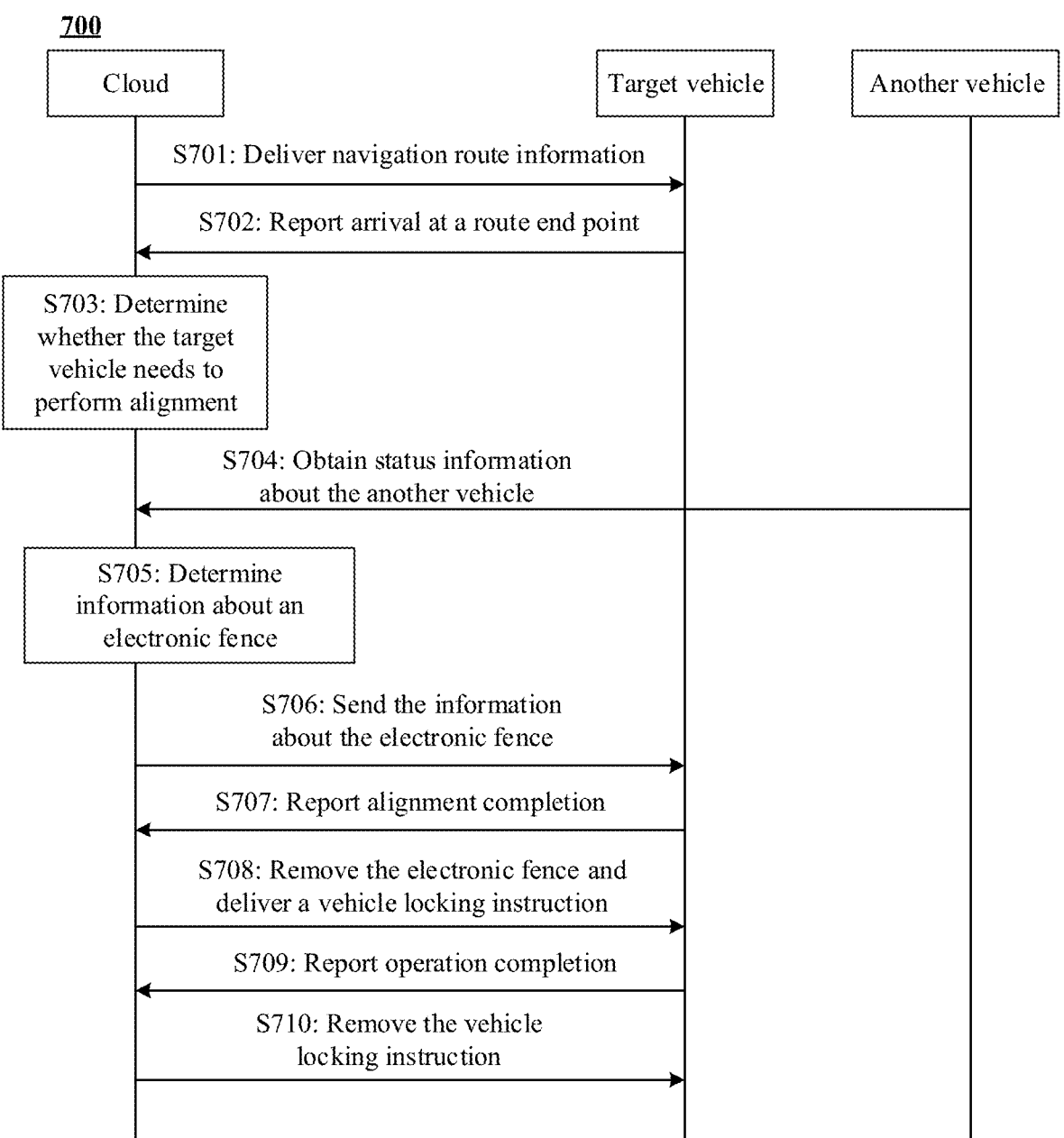
FIG. 7 is a schematic flowchart of a vehicle alignment control method according to an embodiment.

FIG. 7 is a schematic flowchart of a vehicle alignment control method according to an embodiment. As shown in FIG. 7, the method 900 includes but is not limited to the following steps. S701: A cloud delivers navigation route information to a target vehicle.

The navigation route information includes route start point information and route end point information. The target vehicle starts from a route start point to reach a route end point based on the navigation route information. After the target vehicle reaches the route end point, step S702 is performed.

S702: The target vehicle reports the route end point.

S703: The cloud determines whether the target vehicle needs to perform alignment. In other words, when receiving the route end point information reported by the target vehicle, the cloud determines whether the target vehicle needs to perform an alignment operation. If the alignment operation needs to be performed, step S704 is performed.

S704: The cloud obtains information about another vehicle. For example, when the target vehicle needs to perform the alignment operation, to ensure driving safety of both the ego vehicle and the another vehicle, and ensure maximum space in which the target vehicle moves at an alignment moment, the cloud needs to obtain status information of the another vehicle, and then performs step S705.

S705: The cloud determines information about an electronic fence based on a task requirement and/or the information about the another vehicle. It may be understood that a zone defined by the electronic fence is maximum space that can be adjusted when the target vehicle performs the alignment operation.

S706: The cloud sends the information about the electronic fence to the target vehicle. Correspondingly, the target vehicle performs the vehicle alignment operation based on the information about the electronic fence. After the alignment operation is completed, step S707 is performed.

S707: The target vehicle reports alignment completion.

S708: The cloud delivers, to the target vehicle, both information about removing the electronic fence and a vehicle locking instruction.

After the alignment operation is completed, the target vehicle receives the information about removing the electronic fence, and receives the vehicle locking instruction delivered by the cloud. Then, the target vehicle starts operation. After the operation is completed, step S709 is performed.

S709: The target vehicle reports operation completion.

S710: The cloud sends a vehicle unlocking instruction to the target vehicle.

In the foregoing method, steps 701 to 704 are an example in which the cloud obtains the task information of the target vehicle and the information about the vehicle corresponding to the task. During alignment control, the task obtained by the cloud is alignment control, and the cloud obtains the information about the another vehicle corresponding to the task. In addition, the determined information about the electronic fence is sent to the target vehicle by using steps S705 to S706, so that the target vehicle can complete the alignment control operation based on the information about the electronic fence. Further, after the alignment control task is completed, the electronic fence is removed in steps S707 to S710. It may be understood that, for descriptions of the information about the electronic fence and a related process in this embodiment, refer to the embodiment shown in FIG. 4 or FIG. 6. Details are not described herein again.

Figure 8:
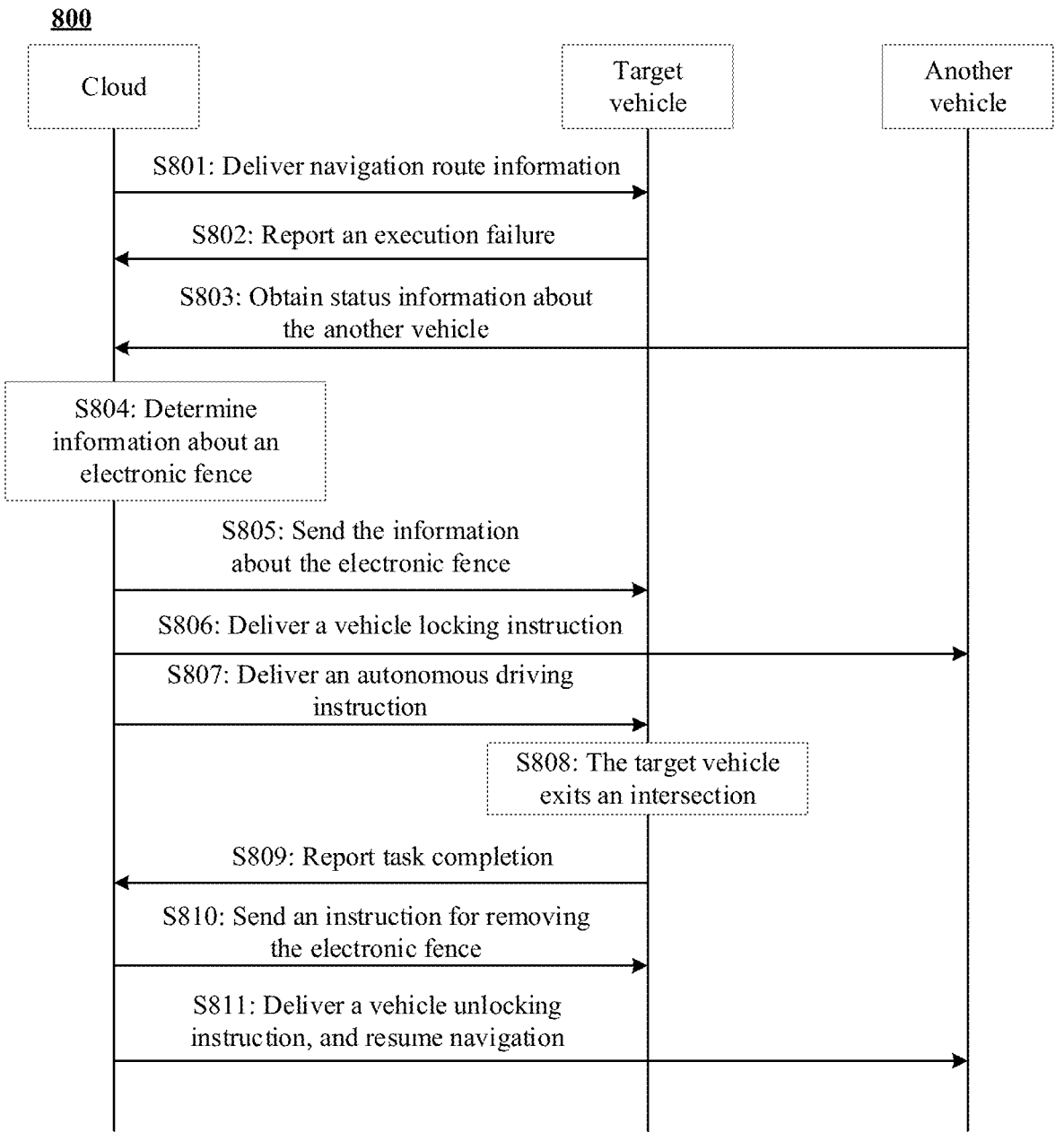
FIG. 8 is a schematic flowchart of a vehicle intersection traffic control method according to an embodiment.

FIG. 8 is a schematic flowchart of a vehicle zone traffic behavior control method according to an embodiment. This embodiment uses an example in which zone traffic behavior is intersection traffic behavior for description. For example, the method may be applied to a commercial vehicle cooperative driving scenario. In this scenario, a target vehicle travels based on a route and an instruction delivered by a cloud, and cooperates with a plurality of vehicles to complete a task. All behavior of the target vehicle is usually specified by the cloud. However, in some scenarios, the target vehicle needs to have a specific autonomous driving capability, for example, physical interaction with another system. In a small scope, compared with the cloud, the target vehicle can implement more accurate position adjustment. For example, in an abnormal scenario, the cloud cannot generate an available route for the target vehicle, and the vehicle needs to overcome trouble. As shown in FIG. 8, the method 800 includes but is not limited to the following steps.

Optionally, in S801, the cloud delivers navigation route information to the target vehicle.

The navigation route information includes route start point information and route end point information. The target vehicle starts from the route start point to reach the route end point based on the navigation route information. After the target vehicle reaches the route end point, step S802 is performed.

Optionally, in S802, the target vehicle reports an execution failure to the cloud.

In other words, the cloud cannot generate the available route for the target vehicle. In this case, the vehicle needs to overcome the trouble, and an action of the target vehicle is not completely controlled by the cloud. To ensure safety of both the target vehicle and another vehicle, the cloud may deliver information about an electronic fence to the target vehicle and the another vehicle. The target vehicle can only travel within the electronic fence, and the another vehicle cannot enter the electronic fence. This is equivalent to a no-traffic zone.

S803: The cloud obtains information about the another vehicle other than the target vehicle. The information about the another vehicle is used to determine the information about the electronic fence.

S804: The cloud determines the information about the electronic fence. The information about the another vehicle is fully considered when the information about the electronic fence is determined, which helps ensure driving safety of the target vehicle.

S805: The cloud sends the information about the electronic fence to the target vehicle.

Figure 9:
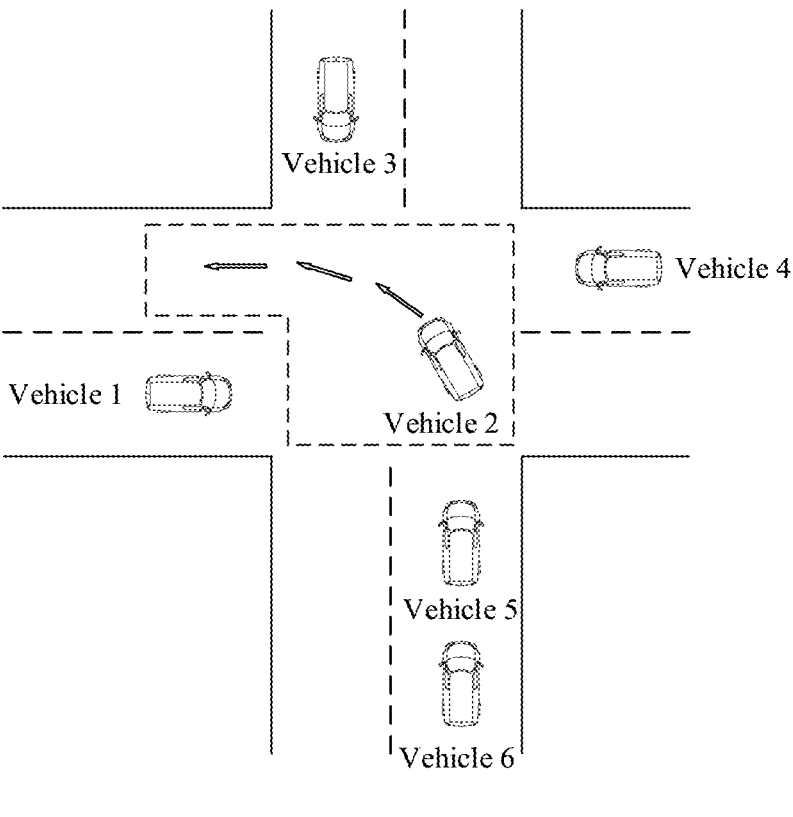
FIG. 9 is a schematic diagram of vehicle intersection traffic according to an embodiment.

For example, with reference to FIG. 9, a vehicle 2 is the target vehicle passing through an intersection, and a dashed line part is the electronic fence. To ensure safe driving of the vehicle 2, the another vehicle other than the vehicle 2 cannot enter a zone defined by the electronic fence.

S806: The cloud delivers a vehicle locking instruction to the another vehicle.

S807: The cloud delivers an autonomous driving instruction to the target vehicle.

S808: The target vehicle exits the intersection.

S809: The target vehicle reports task completion to the cloud.

S810: The cloud sends an instruction for removing the electronic fence to the target vehicle.

S811: The cloud delivers a vehicle unlocking instruction to the another vehicle, and resumes navigation.

It may be understood that, for descriptions of the information about the electronic fence and a related process in this embodiment, refer to the embodiment shown in FIG. 4 or FIG. 6. Details are not described herein again.

Figure 10:
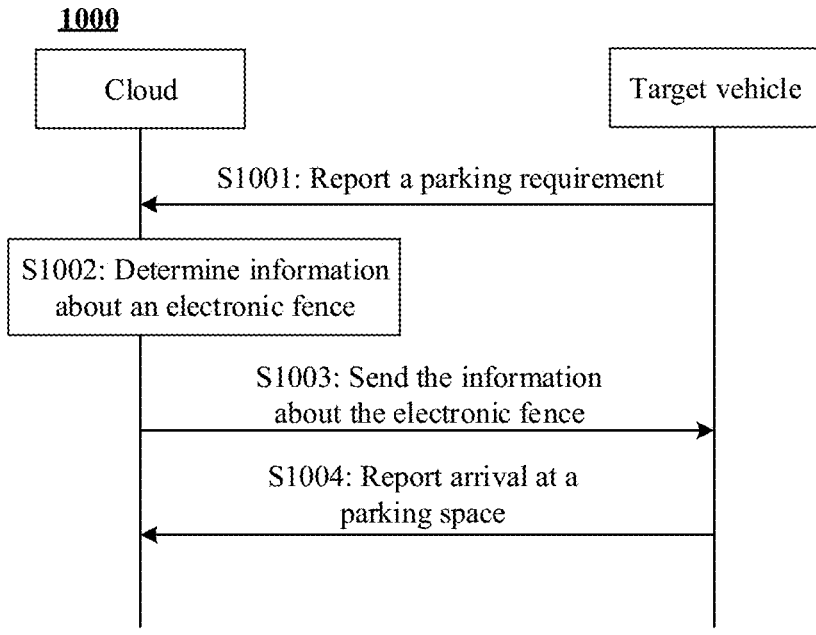
FIG. 10 is a schematic flowchart of a vehicle parking space determining method according to an embodiment.

FIG. 10 is a schematic flowchart of a vehicle parking space division method according to an embodiment. For example, in the field of commercial vehicles and passenger vehicles, parking is an important problem to address: how to maximize space use to park as many vehicles as possible. For a common parking lot, a parking space is usually indicated by marking a line on the ground. However, in a commercial vehicle production environment, there may be no dedicated parking lot or parking space, and any relatively idle road section can be used for parking. Alternatively, in a passenger vehicle environment, a temporary parking lot may not be indicated through ground marking. In this scenario, to effectively use space, virtual parking space division may be performed on a parking zone, and an electronic fence of a corresponding parking space is delivered to a vehicle that needs to park, to effectively use the temporary parking lot.

As shown in FIG. 10, the method 1000 includes but is not limited to the following steps.

S1001: A target vehicle reports a parking requirement.

S1002: A cloud determines information about an electronic fence.

S1003: The cloud sends the information about the electronic fence to the target vehicle.

Figure 11:
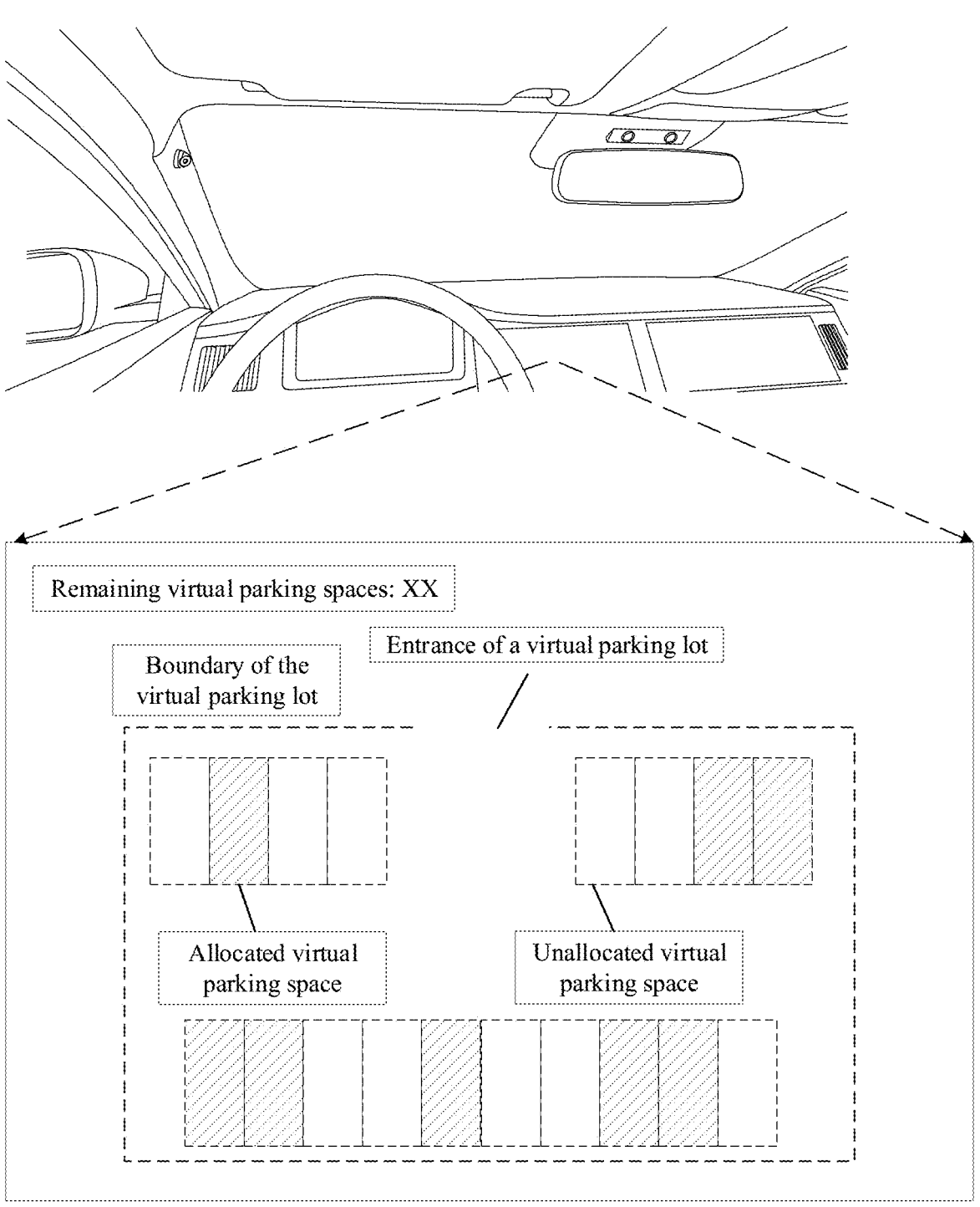
FIG. 11 is a schematic diagram of a vehicle parking space division method according to an embodiment.

For example, as shown in FIG. 11, a boundary of a virtual parking space is defined in a target zone by using an electronic fence, and a status of the parking space is displayed on a display. The status of the parking space includes but is not limited to: an allocated virtual parking space, an unallocated virtual parking space, and boundary information of the virtual parking space. Further the target vehicle is guided to the virtual parking space by using a delivered navigation route.

S1004: The target vehicle reports arrival at the parking space to the cloud.

It may be understood that the parking requirement may be actively reported by the target vehicle, or may be a parking task delivered to vehicles when the cloud centrally schedules the vehicles. Virtual parking spaces can be generated once or dynamically updated as required (for an unallocated part). This is not limited in embodiments of this disclosure.

It may be understood that, for descriptions of the information about the electronic fence and a related process in this embodiment, refer to the embodiment shown in FIG. 4 or FIG. 6. Details are not described herein again.

Figure 12:
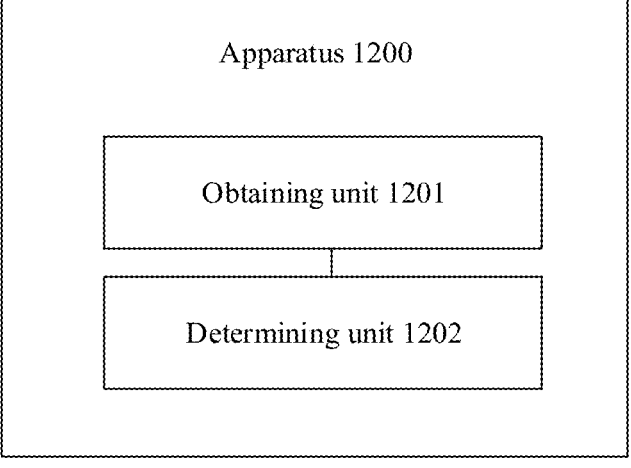
FIG. 12 is a schematic block diagram of an apparatus according to an embodiment.

FIG. 12 is a schematic block diagram of a vehicle control apparatus 1200 according to an embodiment. The apparatus 1200 includes: an obtaining unit 1201, configured by a vehicle to obtain information about an electronic fence, where the information about the electronic fence is determined based on one or more of vehicle information of the vehicle, information about a first task, lane information, and vehicle information of another vehicle; and a determining unit 1202, configured to execute, by the vehicle, the first task based on the information about the electronic fence.

In a possible implementation, the first task includes parking space division, zone traffic behavior, or vehicle alignment.

In a possible implementation, the vehicle information includes at least one of maneuverability of the vehicle, an active safety distance of the vehicle, and route planning of the vehicle.

In a possible implementation, the information about the electronic fence includes time information.

In a possible implementation, the determining unit is further configured to remove the electronic fence based on the time information.

In a possible implementation, the obtaining unit is further configured to obtain indication information, where the information indicates to remove the electronic fence.

In a possible implementation, the indication information is obtained after the first task is completed, the first task is canceled, or an effective time period of the electronic fence ends.

Figure 13:
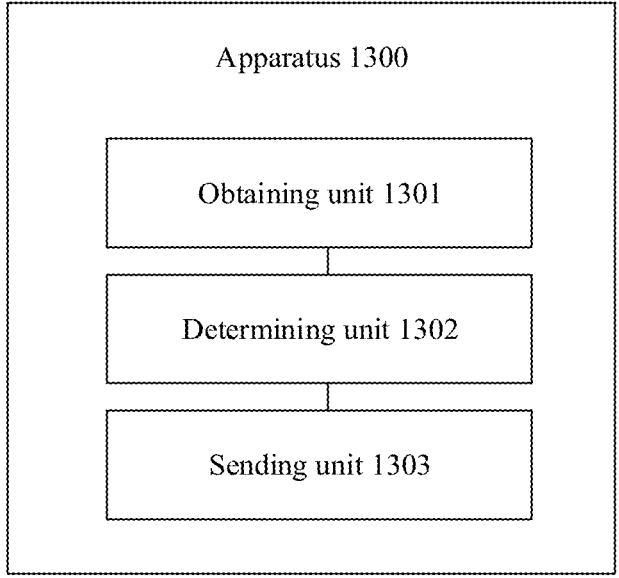
FIG. 13 is another schematic block diagram of an apparatus according to an embodiment.

FIG. 13 is a schematic block diagram of a vehicle control apparatus 1300 according to an embodiment. The apparatus 1300 includes: an obtaining unit 1301, configured to obtain a first task of a vehicle, and information about the vehicle corresponding to the first task; a determining unit 1302, configured to determine information about an electronic fence corresponding to the first task; and a sending unit 1303, configured to send the information about the electronic fence to the vehicle.

In a possible implementation, the first task includes parking space division, zone traffic behavior, or vehicle alignment.

In a possible implementation, the determining unit 1302 is further configured to determine the information about the electronic fence based on one or more of information about the first task, the vehicle information of the vehicle, lane information, and vehicle information of another vehicle.

In a possible implementation, the information about the electronic fence includes time information.

In a possible implementation, the vehicle information includes at least one of maneuverability of the vehicle, an active safety distance of the vehicle, and route planning of the vehicle.

In a possible implementation, the determining unit is further configured to remove the electronic fence based on the time information.

In a possible implementation, the sending unit is further configured to send indication information, where the information indicates to remove the electronic fence.

In a possible implementation, the indication information is obtained after the first task is completed, the first task is canceled, or an effective time period of the electronic fence ends.

Figure 14:
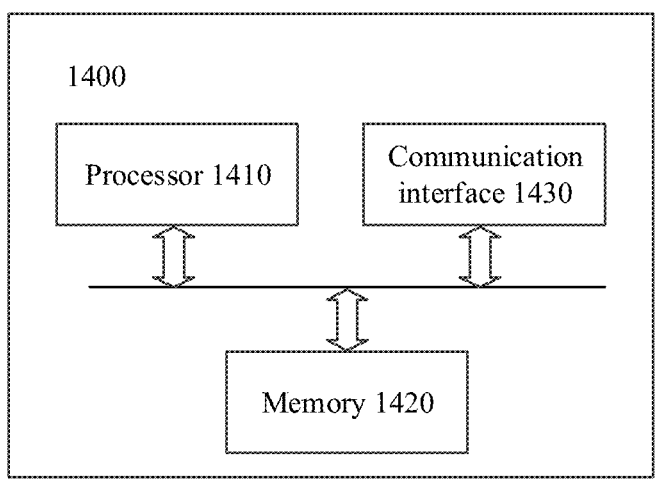
FIG. 14 is another schematic block diagram of an apparatus according to an embodiment.

FIG. 14 is a schematic block diagram of a vehicle control apparatus 1400 according to an embodiment. The apparatus 1400 shown in FIG. 14 includes at least one processor 1410 and a memory 1420, and optionally, may further include a communication interface 1430.

The memory 1420 may be a volatile memory like a random access memory. Alternatively, the memory may be a non-volatile memory like a read-only memory, a flash memory, a hard disk drive (HDD), or a solid-state drive (SSD). Alternatively, the memory 1420 is, but is not limited to, any other medium that can be used to carry or store desired program code in a form of instruction or data structure and that can be accessed by a computer. The memory 1420 may be a combination of the memories.

A connection medium between the processor 1410 and the memory 1420 is not limited in embodiments of this disclosure.

The apparatus in FIG. 14 further includes the communication interface 1430. When communicating with another device, the processor 1410 may transmit data by using the communication interface 1430.

When the communication apparatus is in the form shown in FIG. 14, the processor 1410 in FIG. 14 may invoke computer executable instructions stored in the memory 1420, so that the apparatus 1400 can perform the method performed by the apparatus in any one of the foregoing method embodiments. An embodiment further provides a vehicle control apparatus. The vehicle control apparatus may include the apparatus 1300. The vehicle control apparatus may be presented in a plurality of different product forms. For example, the vehicle control apparatus may be a server. The server may be a single server, or may be a server cluster including a plurality of servers. The server may be a local server. In the field of internet of vehicles, the server may be a cloud server, or may be referred to as a cloud, a cloud end, a cloud server, a cloud controller, an internet of vehicles server, or the like. The cloud server is a collective term for devices or components having a data processing capability, for example, may include a physical device like a host or a processor, or may include a virtual device like a virtual machine or a container, or may include a chip or an integrated circuit. Optionally, the vehicle control apparatus may be an RSU, or a chip or a component in the RSU.

An embodiment further provides a server. The server may include the apparatus 1300.

An embodiment further provides a vehicle. The vehicle may include the apparatus 1200.

An embodiment further provides a computer program product including instructions. When the computer program product runs on the apparatus, the vehicle control method in any one of the foregoing embodiments is performed.

An embodiment provides a computer-readable storage medium. The computer-readable storage medium stores a computer program. When the computer program runs, the vehicle control method in any one of the foregoing embodiments is performed.

The foregoing embodiments may be combined with each other to achieve different technical effects.

It should be understood that sequence numbers of the processes do not mean execution sequences in various embodiments of this disclosure. The execution sequences of the processes should be determined based on functions and internal logic of the processes, and should not be construed as any limitation on the implementation processes of embodiments of this disclosure.

The foregoing descriptions about implementations allow a person skilled in the art to understand that, for the purpose of convenient and brief description, division of the foregoing functional modules is taken as an example for illustration. In actual disclosure, the foregoing functions can be assigned to different functional modules and implemented based on a requirement, that is, an inner structure of an apparatus is divided into different functional modules to implement all or some of the functions described above.

In the several embodiments provided in this disclosure, it should be understood that the disclosed apparatus and method may be implemented in other manners. For example, the described apparatus embodiment is only an example. For example, division into the modules or the units is only logical function division and may be other division in an actual implementation. For example, a plurality of units or components may be combined or integrated into another apparatus, or some characteristics may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to implement the objectives of the solutions of embodiments.

In addition, functional units in embodiments may be integrated into one processing module, each of the units may exist alone physically, or two or more units are integrated into one unit. The integrated unit may be implemented in a form of hardware, or may be implemented in a form of software functional unit.

When the integrated unit is implemented in the form of software functional unit and sold or used as an independent product, the integrated unit may be stored in a readable storage medium. Based on such an understanding, the technical solutions in embodiments of this disclosure essentially, or the part contributing to the conventional technology, or all or some of the technical solutions may be implemented in the form of software product. The software product is stored in a storage medium and includes several instructions for instructing a device (which may be a single-chip microcomputer, a chip or the like) or a processor to perform all or some of the steps of the methods described in embodiments of this disclosure. The foregoing storage medium includes any medium that can store program code, like a universal serial bus (USB) flash drive, a removable hard disk, a read-only memory (ROM), a random-access memory (RAM), a magnetic disk, or an optical disc. The foregoing descriptions are merely exemplary implementations of embodiments, but are not intended to limit the protection scope of embodiments.

Any variation or replacement within the technical scope disclosed in this application shall fall within the protection scope of embodiments. Therefore, the protection scope of embodiments of this disclosure shall be subject to the protection scope of the claims.

What is claimed is:

1. A method, comprising:
obtaining a first task of a first vehicle, and first vehicle information corresponding to the first task, wherein the first vehicle information comprises a first vehicle type of the first vehicle;
obtaining, based on the first vehicle information and the first task, information about an electronic fence;
sending the information about the electronic fence to the first vehicle; and
controlling movement of the first vehicle based on the information about the electric fence.

2. The method of claim 1, wherein the first task comprises parking space division.

3. The method of claim 1, wherein obtaining information about the electronic fence comprises obtaining the information about the electronic fence further based on lane information, wherein the electronic fence corresponds to the first task.

4. The method of claim 3, wherein the first vehicle information further comprises maneuverability of the first vehicle.

5. The method of claim 1, wherein the information about the electronic fence comprises time information.

6. The method of claim 1, further comprising sending an instruction to remove the electronic fence.

7. The method of claim 6, wherein sending the instruction is performed after the first task is completed.

8. A vehicle control method, comprising:
obtaining, by a first vehicle, information about an electronic fence, wherein the information about the electronic fence is based on information about a first task and one or more of first vehicle information, lane information, and second vehicle information of a second vehicle, and wherein the first vehicle information comprises a first vehicle type of the first vehicle; and
controlling, by the first vehicle, movement of the first vehicle based on the information about the electric fence to execute the first task.

9. The method of claim 8, wherein the first task comprises zone traffic behavior.

10. The method of claim 8, wherein the first vehicle information comprises an active safety distance of the first vehicle.

11. The method of claim 8, wherein the information about the electronic fence comprises time information.

12. The method of claim 8, further comprising:
obtaining an instruction to remove the electronic fence; and
removing the electronic fence.

13. The method of claim 12, wherein obtaining the instruction is performed when the first task is cancelled.

14. An apparatus, comprising:
at least one processor; and
a non-transitory computer-readable storage medium configured to store a program that, when executed by the at least one processor, cause the apparatus to:
obtain a first task of a first vehicle, and first vehicle information corresponding to the first task, wherein the first vehicle information comprises a first vehicle type of the first vehicle;

obtain, based on the first vehicle information and the first task, information about an electronic fence;

send the information about the electronic fence to the first vehicle; and control movement of the first vehicle based on the information about the electronic fence.

15. The apparatus of claim 14, wherein the first task comprises first vehicle alignment.

16. The apparatus of claim 14, wherein the program includes instructions to further obtain the information about the electronic fence further based on second vehicle information of a second vehicle, wherein the electronic fence corresponds to the first task.

17. The apparatus of claim 16, wherein the first vehicle information comprises route planning of the first vehicle.

18. The apparatus of claim 14, wherein the information about the electronic fence comprises time information.

19. The apparatus of claim 14, wherein the program includes instructions to remove the electronic fence.

20. The apparatus of claim 19, wherein the instructions cause the apparatus to remove the electronic fence when an effective time period of the electronic fence ends.

* * * * *